March 25, 1924.  1,488,087
G. ZOVICH
PARALLEL RULING APPARATUS
Filed Sept. 8, 1921
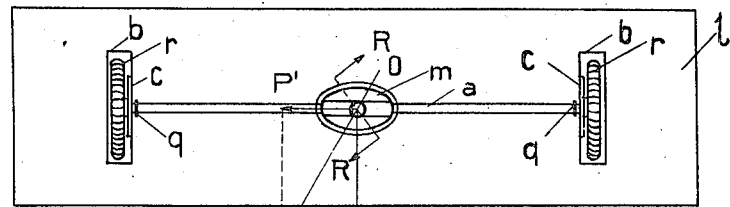
Fig. 1
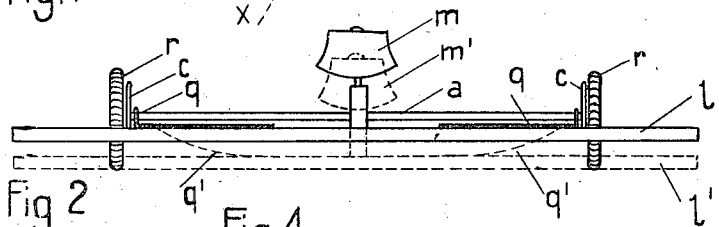
Fig. 2
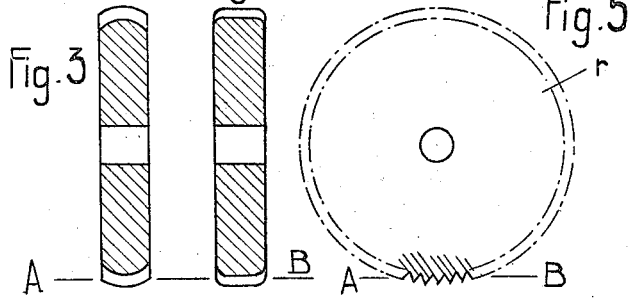
Inventor
Giovanni Zovich
By E. J. + J. F. Brandenburg
Attorneys.

Patented Mar. 25, 1924.

1,488,087

UNITED STATES PATENT OFFICE.

GIOVANNI ZOVICH, OF TRIESTE, ITALY.

PARALLEL-RULING APPARATUS.

Application filed September 8, 1921. Serial No. 499,222.

*To all whom it may concern:*

Be it known that I, GIOVANNI ZOVICH, residing at Trieste, Italy, a citizen of the Kingdom of Italy, have invented certain new and useful Improvements in Parallel-Ruling Apparatus; and I do hereby declare the following to be a full, clear, and exact description of the invention, such as will enable others skilled in the art to which it appertains to make and use the same.

My invention relates to parallel ruling apparatuses and has for its object to provide an apparatus that avoids the use of the well known T-squares and of the triangular set squares in technical drawings, because it has the characteristic, when placed in a determined position, to always displace itself parallelly. Provided that the drawing board bears, on each of two or three of its edges, a stationary jutting out ruler, fixed in one of the usual principal directions, when the drawing apparatus is pushed and caused to dash against one of the said rulers, it shall place itself parallelly to the latter, and constantly and exactly keep such a direction during its displacements across the drawing board. By the term "jutting out ruler," as used in the preceding sentence, is meant a projecting strip of wood fixed to each of two or three edges of the drawing board, to allow the parallel ruling apparatus to be accommodated thereagainst, in order to be oriented in one direction.

A further object of my said invention is to avoid the unfavourable effects of the oblique pushes and stresses produced by the hand of the operator.

A further object of this invention is to provide an apparatus which will be capable of being very easily displaced across the drawings, in order to save any strain to the operator and to avoid any damage to the drawing, only a very small portion of the apparatus keeping itself permanently in contact therewith.

In the annexed drawing, diagrammatically showing an embodiment of my invention, and some constructive details of the same;

Fig. 1 is a plan view and Fig. 2 a front view of the complete parallel ruling apparatus, Figs. 3 and 4 are cross sections of two knurled or toothed travelling rollers in two preferred forms, and Fig. 5 their common side view, partially sectioned. Figs. 6 and 7 show respectively plan sections of the knurlings or teeth of the rollers of Figs. 3 and 4. Fig. 8 is a detail of a bearing at an enlarged scale. Fig. 9 shows a sectional view of the apparatus, taken centrally through the rotatable handle and at right angles to the axis of the rollers.

My improved parallel ruling apparatus comprises a ruler $l$, provided with two rectangular openings $b$, a pair of bearings $c$, wherein a longitudinal rigid axle $a$ is rotatably mounted, and a pair of knurled or toothed rollers $r$ of like diameter extending down through the openings $b$ to rest on the drawing-sheet or -board. The rollers $r$ are fastened to the ends of the axle $a$, so that they only rotate so far as rotates the latter. The knurling or teeth of the rollers operate like the points of compasses, since they keep the parallelism in the displacements of the ruler by continuously maintaining themselves at like development distance from the starting position, with the further advantage that no external influence may affect their motion to cause any deviation or any difference between the displacements of the rollers. By the term "development distance," as used in the preceding sentence, is meant that the ruler will keep parallel with itself, owing to both the rollers always synchronously traveling over the drawing board, thus always being at the same distance from their respective starting positions.

The ruler $l$ is provided in its centre with a vertical pin $z$ rigidly secured, at its lower end, to the ruler $l$, as shown in Fig. 9, and rotatably supporting, at its upper end, a handle $m$. As shown in Fig. 9, the pin $z$ is angularly bent, intermediate of its ends, to provide the inclined portion $z^2$, which clears the axle $a$, the vertical base portion $z'$ of the pin being thus offset with reference to the upper vertical portion of the pin, and being rigidly secured to the ruler $l$.

The geometrical axis of the pin $z$ is at right-angles to the plane of the ruler $l$, and its extension must cross the axis of the rollers in its center, then passing through the center of gravity of the whole apparatus. Two plate springs $q$ are each fastened at one end to the ruler and bent at the other end, that is, provided with a hook, or eye, or the like, to cooperate with and glide on the axle $a$.

The plate springs $q$ cause the axle to usually stay in the lower point $x$ of openings $f$ provided in the bearings $c$ (Fig. 8).

When the apparatus is pushed down, through the medium of the rotatable handle $m$, against the drawing board to the position $m'$, the ruler $l$ will be lowered to the position $l'$, against the resistance of the springs, while the latter take the position $q'$, their bent ends gliding on the axle $a$: thus the ruler is allowed to fully rest on the drawing board.

When on the contrary the apparatus is to be caused to travel across the drawing board, the ruler must be held at a distance from the latter, and the rollers in turning keep the same always parallel to itself.

The springs aim to make easy the movement even if the ruler is removed from the drawing board, furthermore to keep constant the pressure on the rollers, and their adherence against the drawing board.

The latter is one of the premises or conditions in order to obtain the best precision in the apparatus independently of the operator; the other conditions required are fulfilled through the rotatable handle turning on the pivot in the centre of the apparatus, and by effect of the special teeth of the rollers.

Owing to the independence of movements of the draughtsman's arm, his hand during the operation takes different positions relating to the apparatus, which positions would be disadvantageous to the parallelism of the ruler. The movements of the hand to cause the device to displace itself are the actual origin of errors, the elimination of which is attained by the construction shown.

The draughtsman's hand tends to turn the apparatus in the manner shown, for instance, by the couple of forces R, Fig. 1. In order to eliminate such a disadvantageous effect the rotatable handle $m$ is provided. The axis of rotation of the latter shall pass through the center of gravity of the apparatus and its projection shall cross the axis of rotation of the rollers $r$ in its centre, being at a right angle therewith. Furthermore it has been proved that the impulsion of the hand on the handle is never in a plane at right angles with the roller's rotation axis, but always involuntarily oblique and out of that plane, even if kept in a plane nearly parallel to the drawing board. Such a disadvantage the particular teeth or knurling of the rollers will obviate, whereby the lateral slippings, that are the unavoidable consequence of said obliquity, will be caused to only happen parallelly to the axis, i. e. to the axle $a$, and will allow no displacement out of the parallelism of the ruler. This fact is graphically shown by the resolution of the force P in Fig. 1.

The said teeth of the rollers act in such manner that the centre of resistance to their slipping on the drawing board shall constantly be in the plane of transversal symmetry of the apparatus.

The slipping of the knurled or toothed rollers so performed, happens uniformly for both the rollers and parallelly to the axis of rotation.

In Fig. 8 the reference character $y$ of the openings $f$ in the bearings $c$ shows an offset recess allowing the suspension axis to be constantly kept at a distance from the ruler, thus rendering the rollers inoperative, so that the device may be used as an usual drawing ruler.

The apparatus according to my invention is then very suitable for use on the black boards, especially for school-purposes.

It will also be understood that such apparatus may be fully made of metal, the rule being preferably made of band steel, and the rollers being of hardened cut steel; the advantages of the complete elimination of any part of wood are evident in connection with the precision required in this class of devices.

The handle $m$ is pivotally mounted to obviate twisting the ruler out of parallelism during the rolling thereof over a drawing board.

What I claim is:

1. A parallel ruling apparatus, comprising a ruler provided with a pair of transverse slots, a roller adapted to project through each slot, an axle carrying said rollers, and spring connections rotatably connecting said axle to said ruler, and normally maintaining said ruler out of contact with the surface on which said rollers travel, said spring connections comprising two leaf springs, one end of each spring being secured to said ruler and the other end being provided with an eye through which said axle rotatably passes.

2. A parallel ruling apparatus, comprising a ruler provided with a pair of transverse slots, a roller adapted to project through each slot, an axle carrying said rollers, spring connections rotatably connecting said axle to said ruler, and normally maintaining said ruler out of contact with the surface on which said rollers travel, and a pair of upright bearings carried by said ruler, each of said bearings having a vertical guide-slot through which said axle passes.

3. A parallel ruling apparatus, comprising a ruler provided with a pair of transverse slots, a roller adapted to project through each slot, an axle carrying said rollers, spring connections rotatably connecting said axle to said ruler, and normally maintaining said ruler out of contact with the surface on which said rollers travel, and a pair of upright bearings carried by said ruler, each of said bearings having a vertical guide-slot through which said axle passes, each of said guide-slots terminating, at its upper end, in an offset portion.

4. A parallel ruling apparatus, comprising a ruler provided with a pair of transverse slots, a roller adapted to project through each slot, an axle carrying said rollers, spring connections rotatably connecting said axle to said ruler, and normally maintaining said ruler out of contact with the surface on which said rollers travel, a pin carried by said ruler, and a handle rotatably supported upon said pin.

In witness whereof, I have hereunto signed my name in the presence of two subscribing witnesses.

GIOVANNI ZOVICH.

Witnesses:
GIULIO SACERDOTE,
ELISEO PASQUALORE.